June 16, 1931.  D. N. LAMBERT  1,810,835
BACK CHECK FOR GAS METERS
Filed Oct. 8, 1930
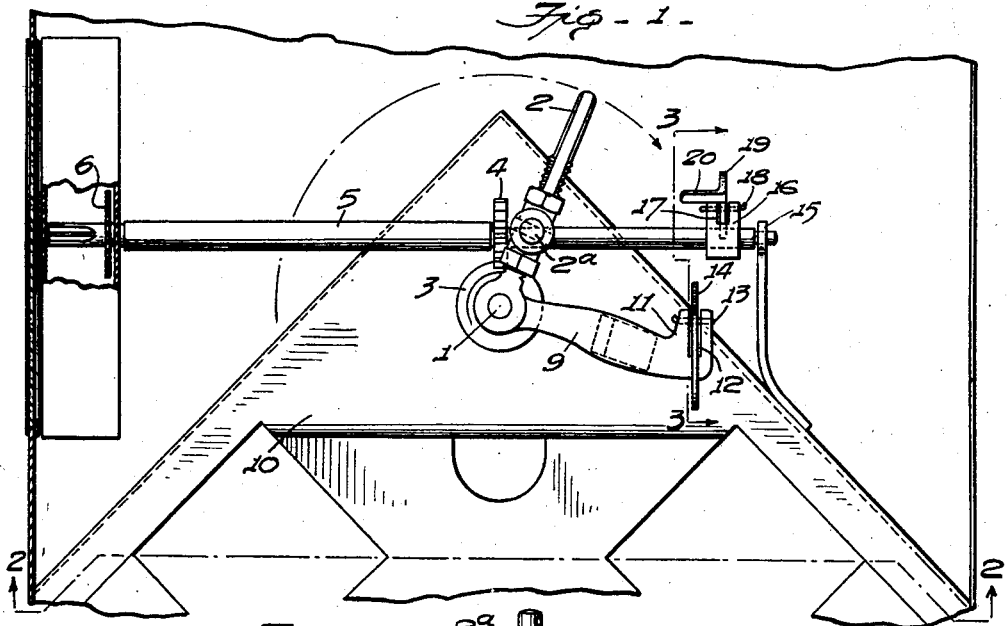
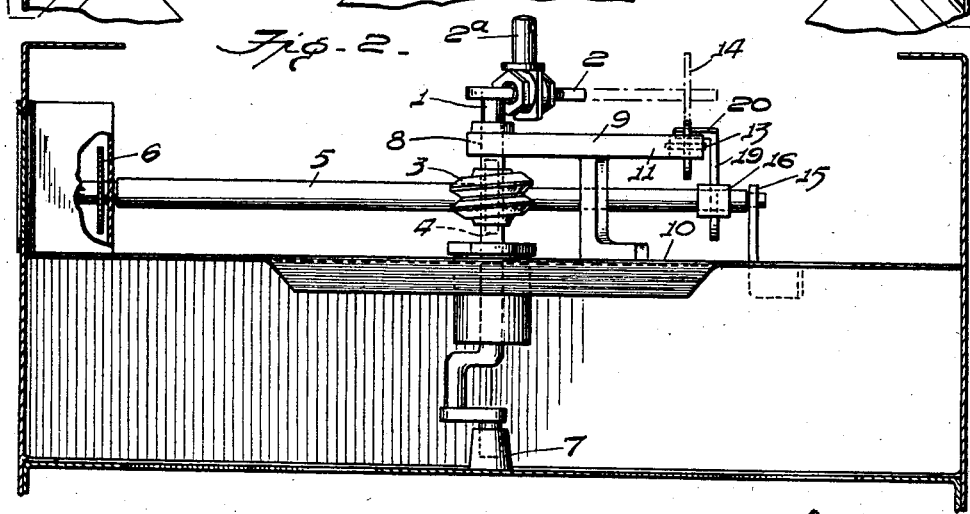
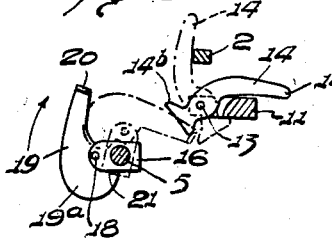
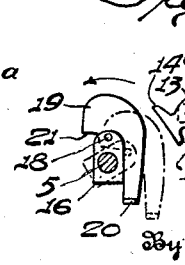
Inventor
DAVID N. LAMBERT
By
Attorney Patented June 16, 1931

1,810,835

UNITED STATES PATENT OFFICE

DAVID N. LAMBERT, OF BROOKLYN, NEW YORK

BACK CHECK FOR GAS METERS

Application filed October 8, 1930. Serial No. 487,316.

The present invention relates to improvements in gas meters and more particularly to mechanism for preventing reverse or backward operation thereof and of the devices indicating the amount of gas passing therethrough for consumption, and the primary object of the invention is to provide a novel and improved back check or stop for preventing fraudulent reverse or backward operation of the meter and its indicating devices, which is noiseless during the normal operation of the meter and will permit reverse operation thereof to a limited but sufficient extent to avoid injury to the meter mechanism should excessive back pressure be accidentally applied thereto.

Back checks have been proposed or used for arresting reverse operation of a meter and its indicating devices, but such back checks have been found objectionable because of the clicking sound they produce during the normal operation of the meter, which is objectionable to consumers, and furthermore, the meter mechanism was liable to damage or to strain of its working parts in the event excessive back pressure were accidentally applied to the meter outlet, as when the temperature of the gas entrained in the line from the meter to an appliance on which the cock is closed rises and thereby causes this body of gas to expand and increase its pressure and to flow back through the meter, or a workman, in cleaning a gas line, inadvertently applies pressure to the outlet instead of the inlet line, the back checks heretofore proposed or used permitting an insufficient extent of reverse or backward operation of the meter mechanism to avoid injury thereof in such events.

These disadvantages are obviated by the improved back check or stop provided by the present invention which, moreover, is simple in construction and reliable in operation, it being set into arresting condition in a simple and effective manner by gravity when reverse or backward operation of the meter mechanism takes place.

In the accompanying drawings, which show the preferred embodiment of the invention:—

Fig. 1 is a top plan view of the improved back check, it being shown mounted in the housing of a gas meter;

Fig. 2 is a vertical section taken on the line 2—2 of Fig. 1, showing the back check in elevation;

Fig. 3 is a vertical section taken on the line 3—3 of Fig. 1, showing diagrammatically the manner in which the controlling pawl comes into engagement with the stop pawl to set it in stopping position when reverse operation of the meter occurs;

Fig. 4 is a view similar to Fig. 3, but showing diagrammatically the manner in which the controlling pawl clears the stop pawl while the meter is in normal operation; and Fig. 5 is a detail perspective view of the controlling pawl.

Similar parts are designated by the same reference characters in the different figures.

The invention is shown in the present instance applied to a gas meter of a well known conventional type embodying a vertical crank 1 which is used in meters of such type to actuate the valves which control the flow of gas to and from the measuring bellows or diaphragms, this crank being mounted within the meter housing and adapted for rotation by the usual tangent arm 2 to which it is fixed. The tangent arm, in meters of such type, is actuated by flag wires and linkage which, in turn are actuated by the bellows or diaphragms, the tangent arm having a tangent bat 2ª to which the links of the flag wires are connected whereby the crank 1 will be rotated in a clockwise direction as indicated by the arrow in Fig. 1 during the normal operation of the meter. Since the bellows or diaphragms, the flag wires and links operated thereby and the gas control valves operated by the crank 1 are well known in the art and form no part of the present invention, they are not shown herein and further description thereof is deemed unnecessary.

The crank 1 actuates the usual dial or other mechanism for indicating the amount of gas passing through the meter, the crank 1 usually having a worm 3 fixed thereon and meshing with a gear 4 which is secured on a horizontal shaft 5, the latter being connected to the dial or indicating mechanism 6 so that rotation of the crank 1 will cause rotation of the horizontal shaft 5 at reduced speed, and rotation of the shaft 5 will actuate the dial or indicating mechanism.

The crank 1 is supported at its lower end in a step bearing 7 and at its upper end by a bearing 8, the latter being formed as a part of a bracket 9 which is suitably secured in fixed position on the usual triangle plate 10. The bracket 9 is provided near its outer end with an arm 11 having a vertical slot 12 therein which lies substantially at a right angle to a radius of the crank 1, and this arm supports a pivot pin 13 on which is pivotally mounted a stop pawl 14. This stop pawl is freely movable in a vertical plane in the slot 12 through an angle of approximately 90°, it having an arm 14ª at one end which is at the upper side of the supporting arm 11 and is adapted to lie in an approximately horizontal position on the upper side of the arm 11 and beneath the path in which the tangent arm 2 travels as shown by the full lines in Fig. 3, and it is adapted to occupy an approximately upright position so that it projects into the path of the tangent arm 2 as shown by the dotted lines in said figure. The end of the pawl 14 opposite to the end 14ª thereof is formed with a pair of ears 14ᵇ and 14ᶜ which extend in relatively opposite directions, the ear 14ᶜ being positioned to engage the under side of the arm 11 when the pawl swings into the upright or stopping position, thus limiting the swing of the pawl in such direction and sustaining the force applied to it by the tangent arm 2 during reverse movement thereof. The weight of the pawl 14 is so distributed therein relatively to the pivot pin 13 as to cause the pawl to remain by gravity in either the horizontal inoperative position shown by the full lines in Fig. 3 or in the upright operative position shown in said figure, the center of weight of the pawl passing over the pivot pin 13 when the pawl is moved from either of said positions to the other position.

The stop pawl 14 is mounted at one side of the shaft 5, and this shaft is provided preferably at the end thereof near its supporting bearing 15, with a lug or eccentric portion 16 which is fixed on said shaft so as to turn therewith and is provided, at one side of the shaft, with a slot 17 which extends in the plane of rotation of said shaft, and the lug or eccentric portion 16 carries a pivot pin 18 which is located eccentrically or at one side of the center of the shaft 5 and pivotally supports a controlling pawl 19 which is mounted to rock freely in the slot 17. The pawl 19 is provided at one end with a finger 20 which projects laterally therefrom and intersects the plane of the stop pawl 14, and the controlling pawl is capable of rocking relatively to the portion 16 through an angle of approximately 90°, its rocking movement in one direction being limited by the engagement of the end thereof carrying the finger 20 with one side of the portion 16 as shown by the full lines in Fig. 4 and its rocking movement in the opposite direction being limited by the engagement of a shoulder 21 at its opposite end with the opposite side of the portion 16 as shown by the full lines in Fig. 3. The pawl 19 is formed with an enlargement 19ª at the outer side of its pivot 18 whereby the weight of this pawl will be so distributed that while the shaft 5 is rotating in a forward direction during the normal operation of the meter and the pivot 18 is being carried around the shaft 5 past the stop pawl, the end of the pawl 19 carrying the finger 20 will lie by gravity against the lug or eccentric portion 16, as shown in Fig. 4, so that the finger 20 will travel in a relatively small circle and it will clear the stop pawl 14, thus leaving the latter in its lowered or inoperative position where it will clear the tangent arm 2, but when the shaft 5 is rotated in the opposite direction, as takes place when the meter mechanism is operated in a reverse manner, the controlling pawl 19 will be held by gravity in the position shown in Fig. 3 with its shoulder 21 bearing against the eccentric portion 16 as the controlling pawl approaches the stop pawl, the finger 20 of the pawl 19 then swinging in a relatively larger circle about the shaft 5 as a center, the ear 14ᵇ on the stop pawl 14 being then in the path of the finger 20, and as the pawl 19 moves over the top of the shaft 5, the finger 20 thereon engages the upper side of the ear 14ᵇ on the stop pawl, and further advance of the controlling pawl 19, due to the continued reverse rotation of the shaft 5 and while the shoulder 21 on the controlling pawl continues to bear on the eccentric portion 16, causes the finger 20 to bear on the ear 14ᵇ and to force the stop pawl 14 to rock from the full line position into the dotted line position shown in Fig. 3, after which, the arm 20 drops off the ear 14ᵇ and the pawl 19 rocks by gravity into its opposite position, the stop pawl 14 then projecting upwardly into the path of the tangent arm 2 so that it will arrest backward rotation thereof when it comes into engagement with the stop pawl.

The operation is as follows:—

While the meter is operating in the normal manner, the tangent arm 2 rotates in the direction indicated by the arrow in Fig. 1 and the indicator operating shaft 5 rotates in the direction indicated by the arrow in Fig. 4, the stop pawl 14 then lying by gravity in its lowered position on the supporting arm 11 below and clear of the path of the tangent arm and the direction of rotation of the shaft 5 causing the controlling pawl 19 to be held by gravity in a position where the finger 20 thereon will travel past the stop pawl in a relatively small circle concentric with the shaft 5 so that it clears the stop pawl and thus permits it to remain in its normal inoperative position. Should the meter mechanism operate in a reverse direction due, for example, to reversal of the inlet and outlet connections of the meter in an attempted fraudulent use of the meter, the tangent arm will rotate in a reverse or anti-clockwise direction in Fig. 1 and the dial or indicator operating shaft 5 driven from the tangent arm will rotate in the direction indicated by the arrow in Fig. 3. Owing to the worm and gear connection between the tangent arm crank 1 and the dial or indicator operating shaft 5, the tangent arm will make a variable number of revolutions before the controlling pawl 19 is brought to the upper side of the shaft 5, but the controlling pawl as it is lifted and approaches the upper side of the shaft 5, is held by gravity in the position shown in Fig. 3, the finger 20 thereon then swinging in a relatively larger circle about the shaft 5 as a center, and when the controlling pawl reaches a position above the shaft 5, the finger 20 thereon engages the upper side of the ear 14$^b$ on the stop pawl 14, and the further movement of the controlling pawl, due to the continued reverse rotation of the shaft 5, causes the finger 20 to bear downwardly upon the ear 14$^b$ and to rock the stop pawl 14 into its upright operative position, as shown by the dotted lines in Fig. 3, the stop pawl being then in the path of the tangent arm 2, and the tangent arm will engage the stop pawl and its rotation will be thereby arrested, backward operation of the meter mechanism being thereby arrested. Operation of the meter mechanism in the normal forward direction after its reverse operation has been arrested will cause the tangent arm to come against the opposite side of the upstanding stop pawl 14 and restore it to its normal inoperative position as shown in Fig. 4.

While the back check will thus arrest reverse or backward operation of the meter mechanism and thereby preclude fraudulent use of the meter, it will protect the meter mechanism or its parts from strain or injury in the event excessive back pressure is temporarily or accidentally applied to the meter outlet line, as when the gas entrained therein rises in temperature and thus tends to expand and increase in pressure and flow back through the meter, or should the workman inadvertently apply pressure to the meter outlet line instead of the meter inlet line for cleaning purposes, thus causing the meter to operate in a reverse direction. Since the worm and gear connection between the crank 1 and the indicator operating shaft 5 is a reduction gearing which enables a number of revolutions of the crank 1 to take place during each revolution of the shaft 5, the crank 1, which is driven from the measuring bellows or diaphragms and actuates the valves thereof, may rotate reversely a large number of times under the influence of such back pressure and back flow of gas before the controlling pawl is brought into position to set the stop pawl in position to arrest backward rotation of the tangent arm, the meter mechanism being thus permitted to operate in a reverse direction to an extent which will be sufficient to compensate for the amount of the temporary back flow of gas through the meter and thus protect the parts thereof from strain or injury, before such reverse operation of the meter mechanism is arrested. For example, in using the improved back check in a meter having a worm with a single thread on the crank 1 and a cooperating gear having twelve teeth on the shaft 5, which is a normal gear ratio used in meters, the tangent arm will be permitted to make a minimum of three or four reverse revolutions and as many as sixteen or seventeen reverse revolutions before its reverse motion is arrested, thus permitting back flow of gas through the meter to the extent of the large number of reverse revolutions allowed the tangent arm before it is stopped, thereby protecting the meter mechanism against temporary excessive back pressure, although precluding continued reverse operation of the meter, whereas back checks previously proposed or used allowed only from a fraction of one reverse revolution to a maximum of two reverse revolutions of the tangent arm to take place before arresting its motion, and such a small extent of reverse motion allowed the tangent arm in such back checks is insufficient, in many cases, to compensate for such back pressure and the amount of back-flow of gas through the meter, with the result that strain is applied to many of the working parts of the meter mechanism and such parts are frequently broken. The present invention thus obviates this serious objection to meters as heretofore generally constructed.

Since the stop pawl 14 normally lies in stationary position on the upper side of its supporting arm 11 and the controlling pawl clears the stop pawl during the normal operation of the meter, there will be no clicking or other objectionable sound produced by the back check during the normal operation of the meter.

I claim as my invention:—

1. In a meter comprising meter mechanism having a member movable therewith, a back stop pawl normally clear of the path of said member, and a gravity controlled element set during reverse movement of said member to move said pawl into the path of said member to stop it.

2. In a meter comprising meter mechanism having a member movable therewith, a back stop pawl normally clear of the path of said member, and an element held inoperative relatively to said pawl by gravity during movement of said member in one direction and movable by gravity into position to cooperate with said pawl to set it in stopping relation with said member during reverse movement of the latter.

3. In a meter comprising meter mechanism having a member movable therewith, a back stop pawl normally held by gravity out of the path of said member, and a gravity rocked element having means for moving it in a circular vertical path and for causing it to rock into a position to clear said pawl during movement of said member in one direction and for causing it to rock into a position to engage said pawl and move the latter into stopping relation with said member during reverse movement of said member.

4. In a meter comprising meter mechanism having members connected to move at relatively different speeds, a back stop device movable into stopping relation with the member moving at the relatively higher speed, and a controlling device for said back stop device actuated by the member moving at the relatively lower speed.

5. In a meter comprising meter mechanism having members connected to move at relatively different speeds, a back stop device normally inactive but movable into stopping position relatively to the member moving at the relatively higher speed, and a controlling device actuated by the member moving at the relatively lower speed and set, by movement of said members in reverse direction, to move said back stop device into stopping position.

6. In a meter comprising a tangent arm and a crank carrying it, and a shaft connected thereto to operate at a relatively lower speed, a back stop pawl movable into and out of the path of the tangent arm, and a controlling pawl carried by said shaft and operative upon said back stop pawl to move it into the path of the tangent arm.

7. In a meter comprising a tangent arm and a crank carrying it and a horizontal shaft connected thereto to rotate at a relatively lower speed, a back stop pawl movable into the path of the tangent arm, and a controlling pawl carried by said horizontal shaft and set by gravity during reverse rotation of said shaft, into position to move the back stop pawl into the path of the tangent arm.

8. In a meter comprising a tangent arm and a crank carrying it and a horizontal shaft connected thereto and rotating therewith, a back stop pawl movable into the path of the tangent arm, and a controlling pawl pivoted on said horizontal shaft eccentrically thereof and movable by gravity, during forward and reverse rotation of said horizontal shaft, into positions to respectively clear said pawl and to move said pawl into the path of the tangent arm.

9. In a meter comprising a tangent arm and a crank carrying it, and a horizontal indicator actuating shaft connected by reduction gearing to the tangent arm crank to rotate at a relatively lower speed relatively thereto, a back stop pawl normally clear of the path of the tangent arm and movable into the path thereof to stop it, and a controlling pawl pivoted eccentrically on said horizontal shaft and movable past said stop pawl, the controlling pawl being rockable by gravity into a position to clear the stop pawl during forward rotation of the horizontal shaft and rockable by gravity into a position to engage the stop pawl and move it into the path of the tangent arm during reverse rotation of the horizontal shaft.

In testimony whereof I have hereunto set my hand.

DAVID N. LAMBERT.